United States Patent
Arikere et al.

(10) Patent No.: US 12,296,829 B2
(45) Date of Patent: May 13, 2025

(54) CONTROL UNIT AND A METHOD FOR CONTROLLING A WHEEL ON A VEHICLE

(71) Applicant: VOLVO TRUCK CORPORATION, Gothenburg (SE)

(72) Inventors: Adithya Arikere, Gothenburg (SE); Niklas Fröjd, Mölnlycke (SE); Leo Laine, Härryda (SE); Leon Henderson, Härryda (SE); Sidhant Ray, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 41 days.

(21) Appl. No.: 17/452,908

(22) Filed: Oct. 29, 2021

(65) Prior Publication Data
US 2022/0144279 A1 May 12, 2022

(30) Foreign Application Priority Data
Nov. 6, 2020 (EP) ..................................... 20206187

(51) Int. Cl.
*B60W 30/18* (2012.01)
*B60T 8/175* (2006.01)
(Continued)

(52) U.S. Cl.
CPC ....... *B60W 30/18172* (2013.01); *B60T 8/175* (2013.01); *B60T 8/1761* (2013.01);
(Continued)

(58) Field of Classification Search
CPC ....... B60W 30/18172; B60W 2555/20; B60W 2520/10; B60W 2520/12; B60W 2520/26;
(Continued)

(56) References Cited

U.S. PATENT DOCUMENTS

| 5,275,474 A | 1/1994 | Chin et al. |
| 9,340,211 B1 | 5/2016 | Singh |

(Continued)

FOREIGN PATENT DOCUMENTS

| CN | 108715163 A | * 10/2018 | ............ B60W 10/06 |
| CN | 109204317 A | 1/2019 | |

(Continued)

OTHER PUBLICATIONS

SA 1805939, SAE J670, SAE Vehicle Dynamics Standards Committee, Jan. 24, 2008 (Year: 2008).*

(Continued)

*Primary Examiner* — Joan T Goodbody
(74) *Attorney, Agent, or Firm* — Venable LLP; Jeffri A. Kaminski (57) ABSTRACT

The invention relates to a control unit for controlling torque applied to a vehicle wheel provided with a tyre, wherein the control unit comprises or is operatively connected to a data storage, which data storage has a stored tyre model for the tyre, wherein, in the tyre model, longitudinal tyre force is represented as at least a function of longitudinal wheel slip, longitudinal wheel slip being dependent on rotational speed of the wheel and velocity of the vehicle. The control unit is configured to correct said function based on a tyre parameter input and to convert a wheel torque request to a wheel rotational speed request based on the corrected function, and to send the wheel rotational speed request to an actuator for providing a rotational speed of the wheel corresponding to said wheel rotational speed request. The invention also relates to a method and to a kit.

15 Claims, 6 Drawing Sheets

(51) Int. Cl.
*B60T 8/1761* (2006.01)
*B60T 8/1763* (2006.01)

(52) U.S. Cl.
CPC ........ *B60T 8/1763* (2013.01); *B60W 2520/10* (2013.01); *B60W 2520/12* (2013.01); *B60W 2520/26* (2013.01); *B60W 2520/28* (2013.01); *B60W 2520/30* (2013.01); *B60W 2530/10* (2013.01); *B60W 2530/20* (2013.01); *B60W 2555/20* (2020.02); *B60W 2720/28* (2013.01); *B60W 2720/30* (2013.01)

(58) Field of Classification Search
CPC ......... B60W 2520/28; B60W 2520/30; B60W 2530/10; B60W 2530/20; B60W 2720/28; B60W 2720/30
See application file for complete search history.

(56) References Cited

U.S. PATENT DOCUMENTS

| | | | |
|---|---|---|---|
| 9,610,810 B1 * | 4/2017 | Singh | ................ B60C 23/0488 |
| 10,144,433 B2 | 12/2018 | Jonasson et al. | |
| 2019/0322256 A1 | 10/2019 | Tha | |

FOREIGN PATENT DOCUMENTS

| | | | | |
|---|---|---|---|---|
| EP | 3031662 | * | 6/2016 | .............. B60L 15/20 |
| EP | 3031662 A1 | | 6/2016 | |
| WO | WO 03091046 | * | 11/2003 | ......... B60C 23/0408 |
| WO | 2014184344 A1 | | 11/2014 | |
| WO | 2017215751 A1 | | 12/2017 | |
| WO | WO2017215751 | * | 12/2017 | .......... B60T 8/17616 |

OTHER PUBLICATIONS

CN-108715163 PE2E translation with Paragraph numbers (Year: 2018).*
WO 2017215751 WIPO translation with Paragraph numbers (Year: 2017).*
WO03091046 WIPO translation with Paragraph numbers (Year: 2003).*
European Search Report dated Apr. 1, 2021 in corresponding European Patent Application No. 20206187.5, 11 pages.
European Communication pursuant to Article 94(3) EPC dated Jan. 31, 2024 in corresponding European Patent Application No. 20206187.5, 5 pages.

* cited by examiner

CONTROL UNIT AND A METHOD FOR CONTROLLING A WHEEL ON A VEHICLE

TECHNICAL FIELD

The present disclosure relates to a control unit for controlling torque applied to one or more wheels on a vehicle. The disclosure also relates to a vehicle comprising such a control unit. Furthermore, the disclosure relates to a method for controlling torque applied to one or more wheels on a vehicle. Moreover, the disclosure also relates to a computer program, a computer readable medium and to a kit.

The invention can be applied in heavy-duty vehicles, such as trucks, buses and construction equipment. Although the invention will be described with respect to cargo transport vehicles such as semi-trailer vehicles and trucks, the invention is not restricted to this particular vehicle, but may also be used in other vehicles such as cars.

BACKGROUND

The braking system of a heavy duty vehicle is key to safe vehicle operation. The braking system not only limits vehicle velocity when needed, but also plays an important role in maintaining vehicle stability. For instance, if a left wheel of the vehicle runs over an icy area of the road, resulting in reduced friction and grip, while the corresponding right wheel runs on a non-slippery part of the road, then the braking system can be activated to compensate for and counteract the arisen slip situation.

A common approach for requesting a certain tyre force is to use torque control at the actuator level. However, such an approach has significant performance limitations. If a safety critical or excessive slip situation arises, then a relevant safety function (traction control, anti-lock brakes, etc.) steps in and requests a torque override in order to bring the slip back into control. A problem with this is that since the primary control of the actuator and the slip control are often allocated to two different controllers, the latencies involved in the communication between them significantly limits the slip control performance. Thus, there is room for improvement when it comes to controlling torque applied to a vehicle wheel.

SUMMARY

An object of the invention is to provide a control unit and a method which alleviate the drawbacks of the prior art. The object is achieved by a control unit and a method as defined in the accompanying independent claims.

The present inventive concept is based on the realization that the problem of latency may be avoided by providing the torque control at the same vehicle sub-system as the slip control. Such sub-systems have relatively short response times compared to the vehicle control unit from which torque requests are traditionally sent. More specifically, the inventors have realized that by using a tyre model in which a longitudinal tyre force is a function of at least the longitudinal wheel slip, a slip control sub-system can be used to provide a slip request which corresponds to a desired longitudinal force. In particular, the inventors have realized that, in addition to the advantage of providing fast response time, for such control to become accurate, the tyre model should be correctable based on one or more parameters that affect the slip stiffness of the tyre. Thus, in general terms, by adapting a force/slip-based tyre model to a current state of the tyre or current driving conditions, an accurate and fast control of the wheel is enabled. Different aspects and exemplary embodiments will be discussed in the following.

According to a first aspect of the present disclosure, there is provided a control unit for controlling a vehicle wheel provided with a tyre, wherein the control unit comprises or is operatively connected to a data storage, which data storage has a stored tyre model for the tyre, wherein, in the tyre model, longitudinal tyre force is represented as at least a function of longitudinal wheel slip, longitudinal wheel slip being dependent on rotational speed of the wheel and velocity of the vehicle, wherein the control unit is configured to:
receive at least one tyre parameter input, which tyre parameter input includes a measured value of at least one parameter which affects the longitudinal slip stiffness of the tyre,
correct said function in the stored tyre model based on the received tyre parameter input,
obtain or generate a wheel torque request,
convert the obtained or generated wheel torque request to a wheel rotational speed request based on the corrected function, and
send the wheel rotational speed request to an actuator for providing a rotational speed of the wheel corresponding to said wheel rotational speed request.

Thus, by updating a tyre model based on a parameter which affects the longitudinal slip stiffness of the tyre and controlling the rotational speed of the wheel based on the updated tyre model, a fast and accurate slip control is achievable.

The control unit may suitably be provided in an autonomous vehicle or in a driver-operated vehicle.

The data storage may be an on-board data storage available in the vehicle or an off-board data storage, such as cloud-based. In some exemplary embodiments the contents of the data storage may be downloaded to an on-board processor, for instance part of the control unit, wherein the tyre model may be stored and updated on board the vehicle.

It should be understood that although the tyre model, in its most basic form may be the longitudinal tyre force represented as only a function of longitudinal wheel slip, in at least some exemplary embodiments, other variables may also be included in the tyre model. For instance, the tyre model may also include other inputs, such as lateral wheel slip, vertical force on the tyre, etc.

The longitudinal wheel slip may be a positive wheel slip or a negative wheel slip. During for instance acceleration, a positive propulsion slip is always obtained, i.e. the product of the rotational speed of the wheel and its radius is larger than the velocity of the vehicle in the direction of the wheel. During braking, a negative slip is obtained, i.e. the product of the rotational speed of the wheel and its radius is lower than the velocity of the vehicle in the direction of the wheel.

According to at least one exemplary embodiment, in its conversion of the wheel torque request to the wheel rotational speed request, the control unit is configured to calculate a slip request based on the corrected function and to transform the slip request to the wheel rotational speed request using the slip formula:

$$\lambda = \frac{R\omega - v_x}{\max(|R\omega|, |v_x|)}$$

where $\lambda$ is the longitudinal wheel slip, where $R\omega$ is the rotational speed of the wheel, of which R is the wheel radius in meters and $\omega$ is the angular velocity of the wheel, and where $v_x$, is the longitudinal speed of the wheel (in the coordinate system of the wheel). Thus, the wheel rotational speed request is conveniently obtainable from the formula and the function of the tyre model.

Thus, $\lambda$ is bounded between −1 and 1 and quantifies how much the wheel is slipping with respect to the road surface. The control unit may suitably maintain up-to-date information on $v_x$, (in the reference frame of the wheel), while a wheel speed sensor or the like may be used to determine $\omega$.

The longitudinal slip stiffness of a tyre may be expressed as the gradient at any given point of a graph of the longitudinal tyre force as a function of longitudinal wheel slip, in particular the gradient starting from zero force. Thus, a larger longitudinal slip stiffness results in a steeper gradient from zero force. Some parameters, such as age of tyre and wear of the tyre, increase the longitudinal slip stiffness, while other parameters decrease the longitudinal slip stiffness.

The tyre parameter inputs may be received by the control unit in various ways. For instance, one or more sensors may be provided for measuring and conveying values of certain parameters, such as temperature, inflation pressure, normal load, etc. Inputs relating to parameters such as age of tyre, wear of the tyre, may be provided by a counter or the like, which accumulates values (such as by a clock/timer, tachograph, etc.). Some parameter values may also be manually input by an operator person such as a driver of the vehicle or a mechanic.

From the above, it may be understood that according to at least one exemplary embodiment, said at least one parameter can be selected from the group consisting of:
- age of the tyre,
- ambient temperature,
- inflation pressure of the tyre,
- normal load on the tyre, and
- wear of the tyre, suitably approximated as the distance travelled by the tyre.

It is appreciated that any selection combination of one or more of the above parameters is possible and considered explicitly disclosed herein.

Thus, it should be understood that one or more of the parameters may be used for correcting the function in the stored tyre model. The tyre model may, for instance, be corrected on-demand, such as when a wheel torque request has been obtained or generated. However, in other exemplary embodiments, the tyre model may be updated continuously or at certain intervals. For instance, the tyre model may be corrected at different intervals depending on which one or which ones of the parameters that correction is/are based on. For instance, a correction based on the age of the tyre, may be made less frequently than for instance the ambient temperature, since the ambient temperature may quickly change throughout a day and also in dependence of driving scenario.

According to at least one exemplary embodiment, the control unit is configured to correct said function in the stored tyre model by applying a slip stiffness correction factor on said function, the slip stiffness correction factor having a variation with respect to the parameter. Some slip stiffness correction factors may have a variation which increase with an increased value of the respective associated parameter (such as age of tyre and wear of tyre/travelled distance). Other slip stiffness correction factors may have a variation which decreases with an increased value of the respective associated parameter (such a ambient temperature, inflation pressure, normal load). The correction factor relations may suitably be established offline, by identifying properties of the tyre at different conditions. Thus, the correction factors may be determined experimentally for any given brand and/or model of tyre. For instance, an in-door flat track tyre testing equipment may be used for accurately controlling parameters. The parameters investigation may normally include at least three values covering the assumed operational range of the particular parameter. In case a linear influence is anticipated, two measurement points may be sufficient. The variation of the correction factors may in at least some exemplary embodiment be represented in a lookup table or by using a generic function in the actual implementation. Thus, it should be understood that the function of the tyre model may be updated online, during operation of the vehicle, based on one or more correction factors.

According to at least one exemplary embodiment, the control unit is configured to receive a plurality of different tyre parameter inputs, each tyre parameter input including a measured value of a respective one of a plurality of parameters which affect the longitudinal slip stiffness of the tyre, wherein the control unit is configured to correct said function in the stored tyre model by applying a combined correction factor on said function, the combined correction factor being a function of a plurality of slip stiffness correction factors, wherein each slip stiffness correction factor has a variation relative to a respective one of said plurality of parameters. By taking into account several parameters, an even more accurate correction of the function in the tyre model is obtainable, and thus an even more accurate slip control.

In some exemplary embodiments, once all the corrections factors have been determined, they may be combined to estimate the actual slip stiffness $C_{act}$ of the tyre, for example as:

$$C_{act} = C_{nom} * c_{x1} * c_{x2} * c_{x3} * c_{xk}$$

where $C_{nom}$ is the nominal value, and $c_{x1}, c_{x2}, c_{x3} \ldots c_{xk}$ are a number k of correction factors for different respective parameters/variables. The correction factors $c_{x1}, c_{x2}, c_{x3} \ldots c_{xk}$ may suitably be normalized, wherein a value of 1 would represent the nominal case.

Linear or non-linear functions may suitably be used to approximate a change in tyre properties as a function of different parameters.

For instance, for normal load on the tyre, a function that may be used in the tyre model is:

$$c_{Fz} = 1 + c_1(F_z - F_{z0}), c_1 < 0$$

where, $c_{Fz}$ is the slip stiffness correction for normal load, $c_1$ is the stiffness to normal load non-linearity factor, $F_z$ and $F_{z0}$ are the actual and the rated normal loads, respectively.

In some exemplary embodiments, generic non-linear functions that saturate at both ends away from a nominal reference point may be used, such as:

$$c_x = 1 - \tan hk_x(x_{act} - x_0), 0 < k_x < 1$$

where, $c_x$ is the slip stiffness correction for variable x, $k_x$ is the stiffness to variable x sensitivity factor, $x_{act}$ and $x_0$ are the actual and nominal values for variable x.

In some exemplary embodiments, an exponential saturation function may be used which results in rapid change of the properties near the nominal value and saturates as the variable increases:

$$c_x = \frac{c_f}{1 + (c_f - 1)e^{-\frac{k_x x}{x_{max}}}}$$

where, $c_x$ is the stiffness correction factor for variable x, $c_f$ is the final stiffness correction factor at saturation, $k_x$ is the rate of change of stiffness with respect to x near the nominal value, x and $x_{max}$ are the actual and maximum values for the variable x.

It should be understood that the above exemplified parameters do not constitute a complete list of conceivable parameters for said tyre parameter input. Other parameters than those mentioned above may also be used to scale the tyre stiffness. Similarly, other functions may be used to combine the different scaling factors instead of simply multiplying them together. Furthermore, other tyre parameters such as rolling radius, nominal peak friction, etc. can instead be scaled using the above mentioned procedure. This is reflected in the following exemplary embodiment.

Thus, according to at least one exemplary embodiment, said at least one tyre parameter input is a primary tyre parameter input and said at least one parameter is a primary parameter, wherein the control unit is further configured to correct said function in the stored tyre model based on at least one secondary tyre parameter input which secondary tyre parameter input includes a measured value of at least one secondary parameter, the at least one secondary parameter being selected from the group consisting of:
rolling radius,
nominal peak friction, and
rolling resistance coefficient.

Including one or more secondary tyre parameter inputs may further improve the accuracy of the control unit.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to a second aspect of the present disclosure, there is provided a vehicle comprising a control unit according to the first aspect, including any embodiment thereof. The advantages of the vehicle of the second aspect are largely analogous to the advantages of the control unit of the first aspect, including any embodiment thereof.

According to a third aspect of the present disclosure, there is provided a method for controlling torque applied to a vehicle wheel provided with a tyre, comprising:
receiving at least one tyre parameter input, which tyre parameter input includes a measured value of at least one parameter which affects the longitudinal slip stiffness of the tyre,
correcting a tyre model for the tyre based on the received tyre parameter input, wherein in the tyre model, longitudinal tyre force is represented as a function of longitudinal wheel slip, longitudinal wheel slip being dependent on rotational speed of the wheel and velocity of the vehicle, wherein the step of correcting the tyre model comprises correcting said function,
obtaining or generating a wheel torque request,
converting the obtained or generated wheel torque request to a wheel rotational speed request based on the corrected function, and
sending the wheel rotational speed request to an actuator for providing a rotational speed of the wheel corresponding to said wheel rotational speed request.

The advantages of the method according to the third aspect largely correspond to those of the control unit according to the first aspect and the vehicle according to the second aspect. Some exemplary embodiments of the method are listed below.

According to at least one exemplary embodiment, said at least one parameter is selected from the group consisting of:
age of the tyre,
ambient temperature,
inflation pressure of the tyre,
normal load on the tyre, and
wear of the tyre, suitably approximated as the distance travelled by the tyre.

According to at least one exemplary embodiment, the act of correcting comprises applying a slip stiffness correction factor on said function, the slip stiffness correction factor having a variation with respect to the parameter.

According to at least one exemplary embodiment, the method comprises:
receiving a plurality of different tyre parameter inputs, each tyre parameter input including a measured value of a respective one of a plurality of parameters which affect the longitudinal slip stiffness of the tyre, wherein said step of correcting comprises applying a combined correction factor on said function, the combined correction factor being a function of a plurality of slip stiffness correction factors, wherein each slip stiffness correction factor has a variation relative to a respective one of said plurality of parameters.

According to at least one exemplary embodiment, said at least one tyre parameter input is a primary tyre parameter input and said at least one parameter is a primary parameter, wherein said step of correcting comprises correcting said function in the stored tyre model based on at least one secondary tyre parameter input which secondary tyre parameter input includes a measured value of at least one secondary parameter, the at least one secondary parameter being selected from the group consisting of:
rolling radius,
nominal peak friction, and
rolling resistance coefficient.

According to at least one exemplary embodiment, said step of converting comprises calculating a slip request based on the corrected function and to transform the slip request to the wheel rotational speed request using the slip formula:

$$\lambda = \frac{R\omega - v_x}{\max(|R\omega|, |v_x|)}$$

where $\lambda$ is the longitudinal wheel slip, where $R\omega$ is the rotational speed of the wheel, of which R is the wheel radius in meters and $\omega$ is the angular velocity of the wheel, and where $v_x$ is the longitudinal speed of the wheel.

According to a fourth aspect of the present disclosure, there is provided a computer program comprising program code means for performing the method according to the third aspect, including any embodiments thereof, when said program is run on a computer. The advantages of the computer program of the fourth aspect largely correspond to those of the other aspects, including any embodiments thereof.

According to a fifth aspect of the present disclosure, there is provided a computer readable medium carrying a computer program comprising program code means for performing the method according to the third aspect, including any embodiments thereof, when said program product is run on a computer. The advantages of the computer readable medium of the fifth aspect largely correspond to the advantages of the other aspects, including any embodiments thereof.

According to a sixth aspect of the present disclosure, there is provided a kit, comprising a tyre and a tyre model signal, the tyre model signal being adapted to generate a value of a longitudinal tyre force as a function of longitudinal wheel slip of the tyre when mounted on a vehicle. By the provision of such a kit, the other aspects of the present disclosure may advantageously be used. Thus, a kit according to the present disclosure may suitably be delivered to a vehicle manufacturer. The tyre may be mounted to the vehicle and the tyre model signal may be provided, for instances on a computer readable medium, or accessible through some form of computer network such as a cloud-based service or the like. The tyre model signal may suitably include a tyre model represented as at least a function of longitudinal wheel slip, similarly to the above discussions. The tyre model signal may suitably be downloaded to the previously discussed control unit of the vehicle, or to any other suitable on-board data storage device which is accessible by the control unit. In accordance with the above explanations, the control unit may correct the function based on a received parameter input.

It should also be understood that a kit according to the disclosure may be provided by a repair shop, retailer, or any actor. For instance, when a tyre of the vehicle needs to be replaced, a replacement tyre may be provided together with an associated tyre model signal. The kit is then appropriately installed on the vehicle, by mounting the replacement tyre and downloading the tyre model signal to a data storage on the vehicle. Since different brands of tyres have different relationships between longitudinal tyre force and longitudinal wheel slip, a number of different kits are conceivable, wherein in each kit the tyre model signal is specifically associated with the tyre of the kit.

The tyre model signal of the kit suitably comprises a nominal tyre model, i.e. nominal in the sense that the tyre model reflects a substantially unused tyre at a predefined temperature, inflation pressure, etc.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

Figure 1:
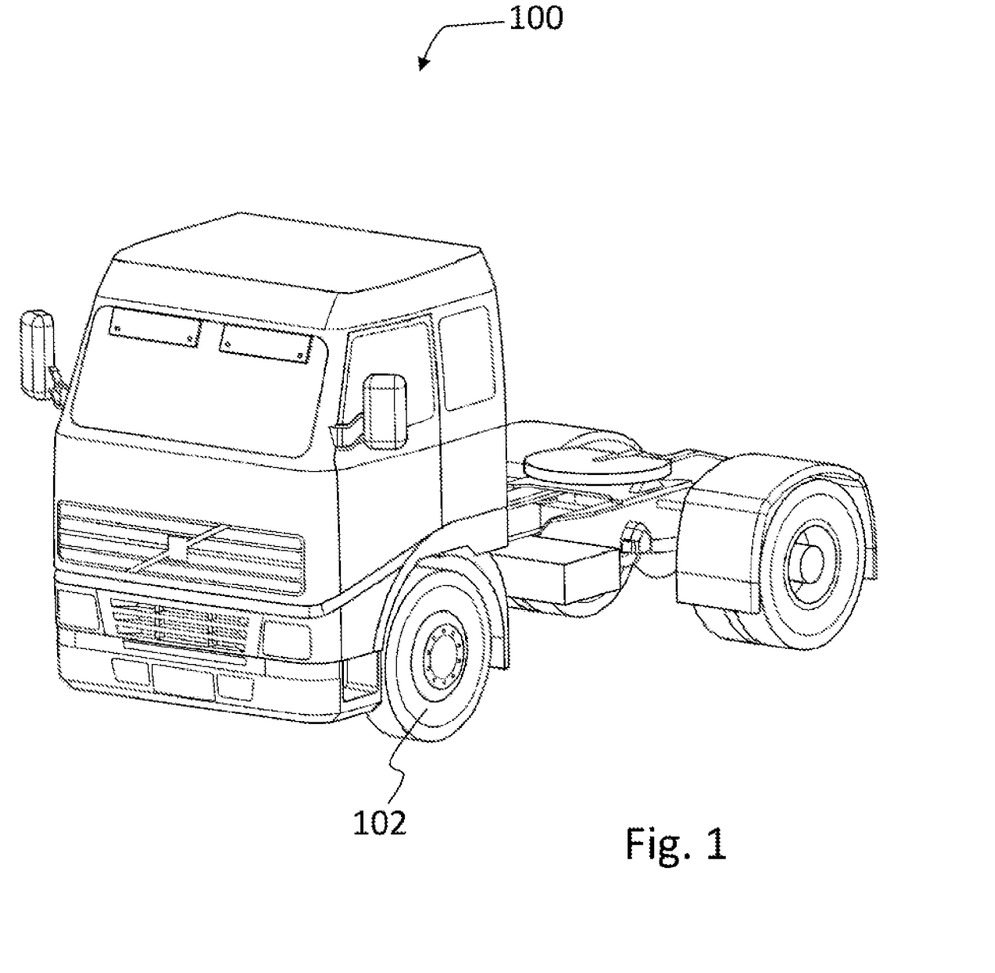
FIG. 1 illustrates a vehicle according to at least one exemplary embodiment of the invention.

FIG. 1 illustrates a vehicle 100 according to at least one exemplary embodiment of the invention. The exemplary illustration in FIG. 1 shows a tractor unit for towing a trailer unit (not shown), which together make up a semitrailer vehicle. However, the invention is applicable to other types of vehicles as well. For instance, the vehicle may be a different type of vehicle for cargo transport, such as a truck, or a truck with a dolly unit arranged to tow a trailer unit, etc. It should furthermore be understood that the inventive concept is not limited to heavy duty vehicles, but may also be implemented in other vehicles, such as cars.

The illustrated vehicle 100 is supported on wheels 102, some of which are driven wheels. Although the vehicle 100 in FIG. 1 only has four wheels 102, the inventive concept is applicable to vehicles having more wheels, such as in the above-mentioned different types of vehicles.

Each wheel 102, or at least a majority of the wheels, is associated with a respective wheel brake. This wheel brake may, e.g. be a pneumatically actuated disc brake or drum brake, but most aspects of the disclosure are also applicable to regenerative brakes which produce electrical power during vehicle retardation, and electrical machines able to slow down wheel rotational velocity upon request. The wheel brakes are controlled by a wheel end module (WEM), which may control applied braking force on at least one wheel 102 of a vehicle such as the vehicle 100 in FIG. 1. Each WEM is communicatively coupled to a control unit (not shown in FIG. 1), allowing the control unit to communicate with the WEM and thereby control vehicle braking. This control unit may potentially comprise a number of sub-units distributed across the vehicle 100, or it may be a single physical unit. The control unit may e.g. allocate brake force between wheels to maintain vehicle stability.

Each driven wheel 102 may be driven by a suitable electrical machine (such as an electrical motor, a combined motor/generator, etc.) The electrical machine may drive more than one wheel, e.g. working across an open differential. In other exemplary embodiments, each driven wheel may be propelled by an individually associated electrical machine. In either case, the above-mentioned control unit may suitably be communicatively coupled to such electrical machines for allocating the propulsion force between wheels. A more detailed discussion of the above-discussed a control unit will now follow in connection to the presentation of FIG. 2.

Figure 2:
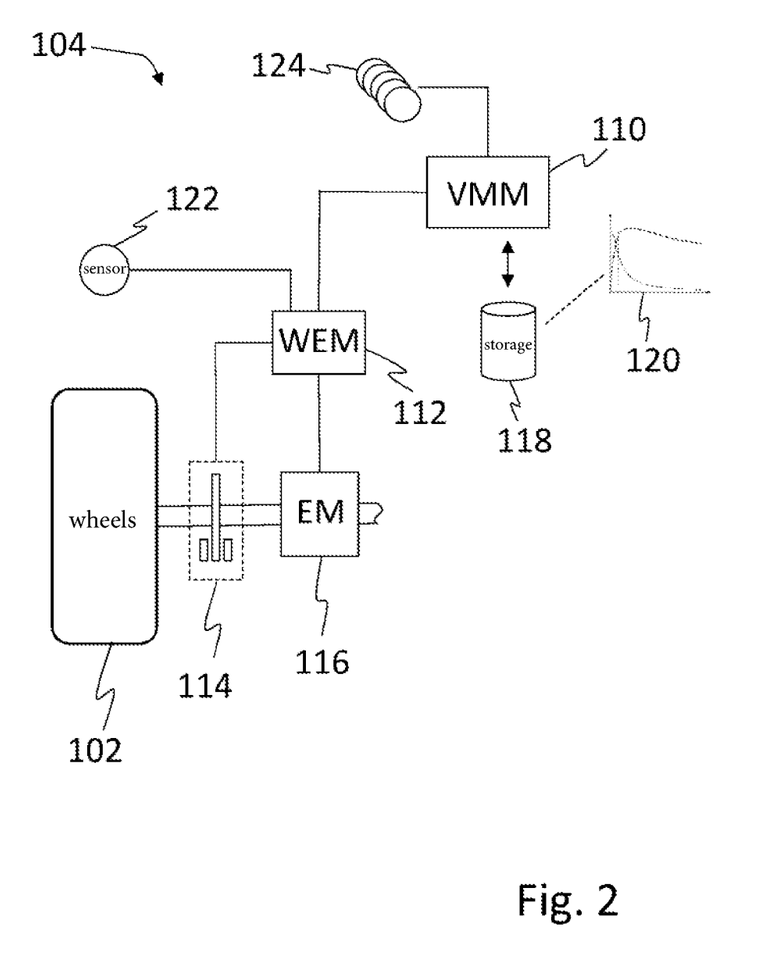
FIG. 2 illustrates a control system in which a control unit according to at least one exemplary embodiment of the invention has been included.

FIG. 2 illustrates a control system 104 in which a control unit 110 according to at least one exemplary embodiment of the invention has been included. More specifically, there is illustrated a control system 104 for a wheel 102, here exemplified by the vehicle front axle left wheel. A wheel end module (WEM) 112 is arranged to control the wheel braking by a brake actuator 114, i.e. a part of the brake system, here exemplified by a disc brake. The brake system may also comprise one or more electrical machines (EM) 116, and/or combinations of different brake actuators. The illustrated EM 116 may also be controlled to provide a propulsion force to the wheel 102.

The WEM 112 is communicatively coupled to the control unit 110, e.g. a vehicle motion management (VMM) system. Although the WEM 112 and the VMM 110 have been illustrated as two functionally separate entities, it should be understood that they may be structurally provided as one common entity. Thus, in some exemplary embodiments the WEM 112 and the VMM 110 are provided as one unit. In other exemplary embodiments, the WEM 112 and the VMM 110 may be structurally separated. It should also be understood that the VMM 110 may be distributed over several structural entities, some of which may be remote from the vehicle, e.g. off-board. For instance, some functionalities, such as calculations made by the VMM 110 may be cloud-based, wherein part of the VMM 110 may be provided at one or more remote servers, etc.

As already explained previously, the inventive control unit 110, here embodied as the VMM 110 may comprise or be operatively connected to a data storage 118. The data storage 118 may thus be on-board the vehicle or off-board. FIG. 2 schematically illustrates a graph to depict that the data storage 118 has a stored tyre model 120 for the tyre of the wheel 102. As will be discussed in more detail in connection with FIG. 3, in the tyre model 120, longitudinal tyre force is represented as at least a function of longitudinal wheel slip. Longitudinal wheel slip is dependent on the rotational speed of the wheel and the velocity of the vehicle. The rotational speed of the wheel may be measured by a speed sensor 122 (see FIG. 2), such as a Hall-effect sensor or other type of wheel speed sensor. The measured rotational speed may be transmitted from the sensor 122 to the WEM 112, by wireline or wireless communication link. The velocity of the vehicle 100 may be measured by another sensor (not illustrated), such as a radar sensor, a lidar sensor, or a global positioning system (GPS) receiver, the measured velocity being obtainable by the VMM 110 and/or the WEM 112.

As previously explained, in order to provide accurate control of the wheel 102 based on the tyre model 120, the tyre model 120 should be updated to current conditions. Herein, control of the wheel 102 is to be construed broadly to comprise control actions such as torque control where the applied torque is controlled to follow a target torque, speed control where the wheel rotational velocity is controlled to follow a target speed, or wheel slip control where wheel speed or torque is controlled to as closely as possible follow a target wheel slip.

A tyre may be affected by various different factors, such as ambient temperature, inflation pressure, normal load, age, wear, etc. These and other factors may suitably be quantified as measurable parameters, and be provided as tyre parameter inputs. FIG. 2 schematically illustrates that the VMM 110 is configured to receive a plurality of tyre parameter inputs 124, however, it should be understood that in other exemplary embodiments, the VMM 110 may be configured to receive only one tyre parameter input 124. Thus, in general terms, a control unit 110 (such as the VMM 110) should, in accordance with the present disclosure, be configured to receive at least one tyre parameter input 124. Each tyre parameter input includes a measured value of at least one parameter which affects the longitudinal slip stiffness of the tyre, which will be discussed in more detail in connection with FIG. 3. Based on the received tyre parameter input 124, the VMM 110 is configured to correct the function in the stored tyre model 120. Thus, the tyre model 120 will be updated by the VMM 110 based on current conditions, and therefore a more accurate control is achievable based on the corrected tyre model 120.

Accordingly, when the VMM 110 obtains a wheel torque request or otherwise determines a desired tyre force to be generated at the wheel 102, it can convert the obtained wheel torque request or desired tyre force to a wheel rotational speed request or wheel slip request based on the corrected function of the tyre model 120. The VMM sends the wheel rotational speed request to an actuator, such as the brake actuator 114 or the EM 116 (via the WEM 112) for providing a rotational speed of the wheel 102 corresponding to said wheel rotational speed request.

Figure 3:
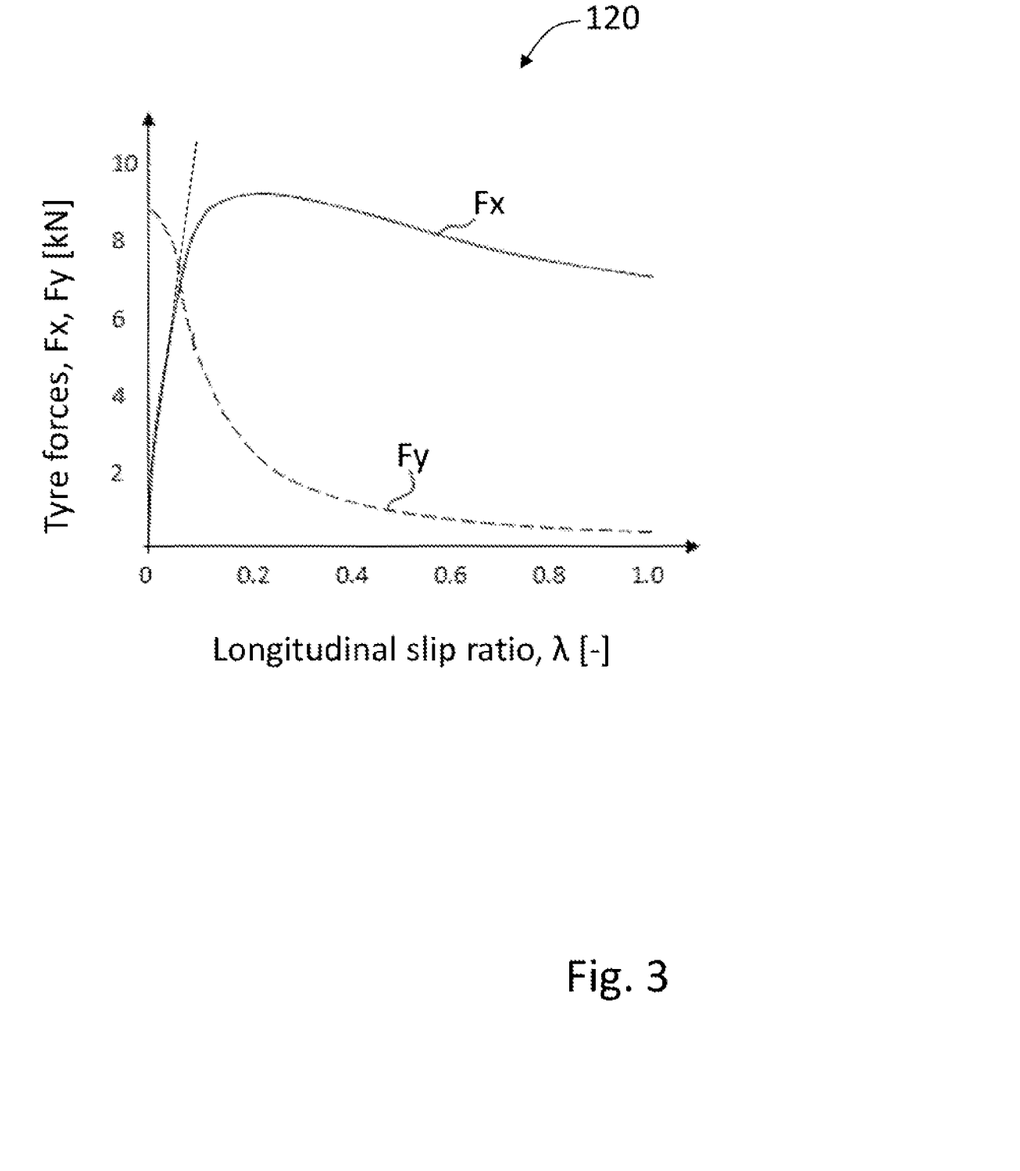
FIG. 3 illustrates an example of a tyre model in which tyre forces are represented as a function of longitudinal wheel slip.

FIG. 3 illustrates an example of a tyre model 120 in which tyre forces are represented as a function of longitudinal wheel slip. The longitudinal tyre force Fx is illustrated by the unbroken curve, while a maximum obtainable lateral tyre force Fy is illustrated by the dashed curve. It should be noted that in this connection, longitudinal refers to a radial direction of the wheel 102, specifically the radial direction which is parallel to the road surface and along which the wheel 102 is heading under normal conditions. The term lateral refers to a direction which is parallel to the wheel rotational axis. The longitudinal slip ratio, or simply longitudinal wheel slip, $\lambda$, is unitless, and may be expressed as:

$$\lambda = \frac{R\omega - v_x}{\max(|R\omega|, |v_x|)}$$

where R is the wheel radius in meters, $\omega$ is the angular velocity of the wheel, and $v_x$ is the longitudinal speed of the wheel (in the coordinate system of the wheel). Thus, $\lambda$ is bounded between −1 and 1 and quantifies how much the wheel is slipping with respect to the road surface. During braking, $v_x > R\omega$, and thus the wheel slip is negative. During acceleration, $v_x < R\omega$, and thus the wheel slip is positive. The VMM 110 may maintain/obtain information on $v_x$, (in the reference frame of the wheel), while the wheel speed sensor 122 may be used to determine ω.

The longitudinal tyre force Fx has an initial steep rise from zero up to the maximum of the curve. Although the rise is not perfectly constant it may be approximated by a gradient. This gradient is also referred to as the longitudinal slip stiffness of the tyre. The longitudinal slip stiffness may be affected by various parameters, as has already been mentioned above. For instance, the longitudinal slip stiffness increases with the age and wear of the tyre, but decreases with the inflation pressure and temperature. This is illustrated in FIGS. 4a-4d.

Figure 4A:
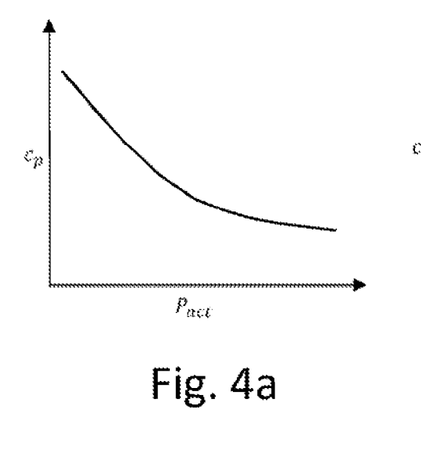
FIGS. 4*a*-4*d* illustrate different slip stiffness correction factors having a variation with respect to a respective parameter.
Figure 4B:
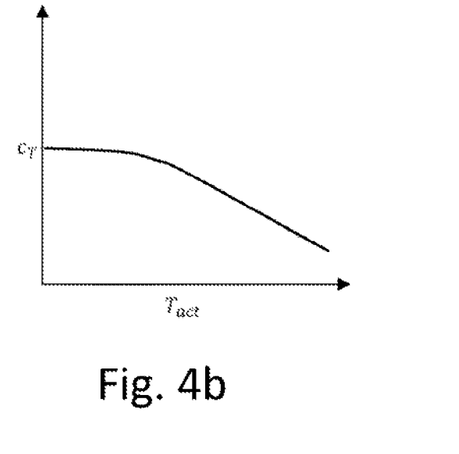
Figure 4C:
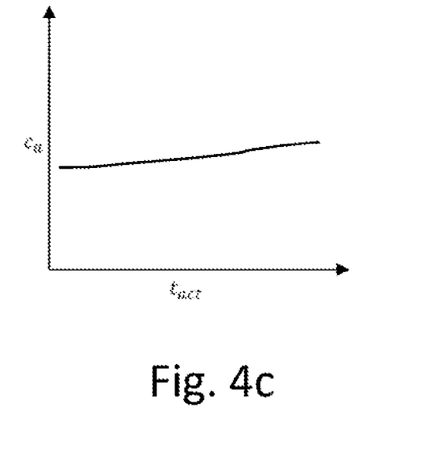
Figure 4D:
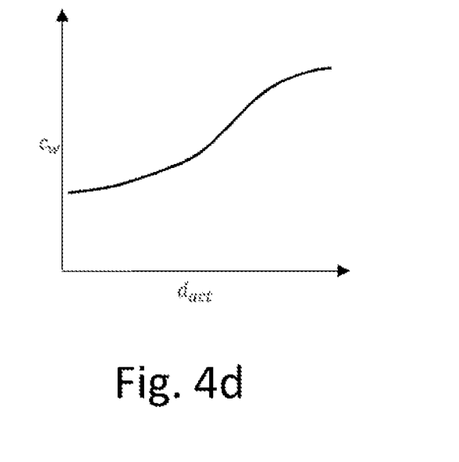

FIGS. 4a-4d illustrate different slip stiffness correction factors having a variation with respect to a respective parameter. The x-axes in FIGS. 4a-4d represent parameter value while the y-axes represent the respective slip stiffness correction factor. No values are shown in FIGS. 4a-4d. However, as discussed above, it is appreciated that the actual correction factor values or functions may be determined experimentally for any given brand and/or model of tyre. For instance, an in-door flat track tyre testing equipment may be used for accurately controlling parameters. FIG. 4a shows a graph of a first slip stiffness correction factor $c_p$ as a function of the actual inflation pressure $P_{act}$ of the tyre. FIG. 4b shows a graph of a second slip stiffness correction factor $c_T$ as a function of the actual ambient temperature $T_{act}$. FIG. 4c shows a graph of a third slip stiffness correction factor $c_a$ as a function of the age $t_{act}$ of the tyre. FIG. 4d shows a graph of a fourth slip stiffness correction factor $c_w$ as a function of the wear of the tyre (approximated as distance $d_{act}$ travelled according to the tachograph). Other slip stiffness correction factors, such as a function of normal load, are also conceivable.

In FIGS. 4a-4d the different slip stiffness correction factors are normalized and a value of 1 would represent the nominal case. Once all the slip stiffness correction factors have been determined, they may be combined by the VMM 110 to estimate the actual longitudinal slip stiffness $C_{act}$ of the tyre:

$$C_{act}=C_{nom}*c_p*c_T*c_a*c_w \ldots *c_x$$

where $C_{nom}$ is the nominal value of the longitudinal slip stiffness of the specific tyre model 120 at hand, and where $c_x$ simply symbolizes that other parameters may be included, such as normal load on the tyre.

As should be understood from the above discussions, the longitudinal slip stiffness may be defined as the slope of the longitudinal tyre force Fx versus the longitudinal wheel slip (illustrated by the dashed gradient in FIG. 3). This longitudinal slip stiffness will have units N/slip (where slip is unitless, thus, in practice the longitudinal slip stiffness has units N). The longitudinal slip stiffness may be normalized by dividing it with the normal load on the tyre, to give a unitless variable (the reason being that longitudinal slip stiffness increases almost linearly with normal load (within a certain load range)). Thus, in the above equation, the actual longitudinal slip stiffness $C_{act}$ may be normalized and unitless.

Thus, it should be understood that the VMM 110 may receive tyre parameter inputs 124 (see FIG. 2) from one or more sensing or measuring devices, or the like, and based on those tyre parameter inputs 124, the VMM 110 may calculate corresponding slip stiffness correction factors (FIG. 4), in order to correct the function stored in the tyre model 120 (FIG. 3).

Thus, in general terms, the VMM 110 is configured to correct the function in the stored tyre model 120 by applying one or more slip stiffness correction factors on said stored function. In particular, the VMM 110 may receive a plurality of different tyre parameter inputs 124, each tyre parameter input including a measured value of a respective one of a plurality of parameters which affect the longitudinal slip stiffness of the tyre, wherein the VMM 110 is configured to correct the function in the stored tyre model 120 by applying a combined correction factor on said function, the combined correction factor being a function of a plurality of slip stiffness correction factors, wherein each slip stiffness correction factor has a variation relative to a respective one of said plurality of parameters.

When the VMM 110 obtains a wheel torque request, or otherwise determines a desired tyre force to be generated at the wheel 102, i.e. a certain longitudinal tyre force Fx, the VMM may access the corrected function of the tyre model 120, and convert it to a longitudinal slip ratio, and then based on the above slip equation convert the wheel torque request into a wheel rotational speed request. The VMM 110 will then send the wheel rotational speed request to an actuator (e.g. brake actuator 114 and EM 116) for providing a rotational speed w of the wheel 102 corresponding to said wheel rotational speed request. Alternatively, the VMM 110 will send a slip request and the actuator may have sensor readings to perform slip control.

Figure 5:
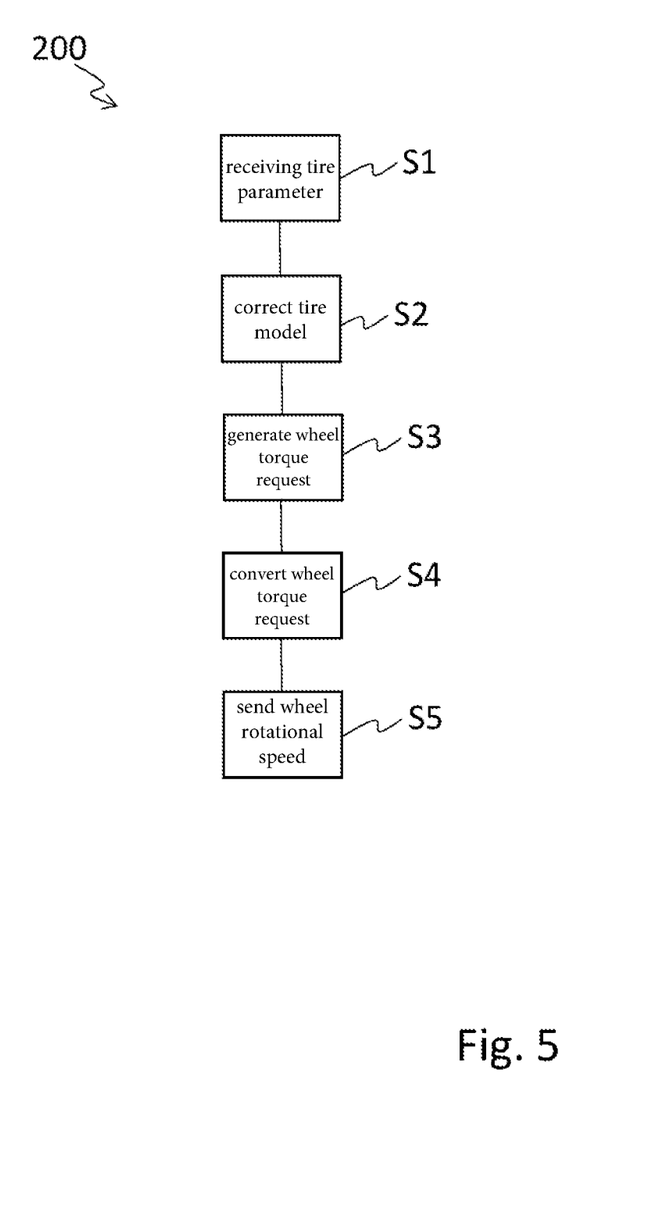
FIG. 5 schematically illustrates a method according to an exemplary embodiment of the invention.

FIG. 5 schematically illustrates a method 200 according to an exemplary embodiment of the invention. More specifically, FIG. 5 illustrates an exemplary embodiment of a method 200 for controlling torque applied to a vehicle wheel 102 provided with at tyre. It should be understood that the steps in FIG. 5 do not need to be performed in the illustrated order. Other sequences are equally conceivable. Furthermore, some of the steps may be performed simultaneously. Thus, as a purely exemplifying illustration, the method of FIG. 5 comprises:

in a step S1, receiving at least one tyre parameter input, which tyre parameter input includes a measured value of at least one parameter which affects the longitudinal slip stiffness of the tyre, in a step S2, correcting a tyre model for the tyre based on the received tyre parameter input, wherein in the tyre model, longitudinal tyre force is represented as a function of longitudinal wheel slip, longitudinal wheel slip being dependent on rotational speed of the wheel and velocity of the vehicle, wherein the step of correcting the tyre model comprises correcting said function, in a step S3, obtaining or generating a wheel torque request, in a step S4, converting the obtained wheel torque request to a wheel rotational speed request based on the corrected function, and in a step S5, sending the wheel rotational speed request to an actuator for providing a rotational speed of the wheel corresponding to said wheel rotational speed request.

As explained above, the order of the steps may be different than the one listed above. For instance, step S3 may be performed before or simultaneously with step S1 and/or step S2.

According to at least one exemplary embodiment, step S2 may comprise the act of applying a slip stiffness correction factor on said function, the slip stiffness correction factor having a variation with respect to the parameter, as already discussed above in more detail. According to at least one exemplary embodiment, step S1 may comprise the act of receiving a plurality of different tyre parameter inputs, wherein step S2 comprises the act of applying a combined correction factor on said function, as already discussed above in more detail. According to at least one exemplary embodiment, step S4 comprises the act of calculating a slip request based on the corrected function and to transform the slip request to the wheel rotational speed request as already described above in more detail.

Figure 6:
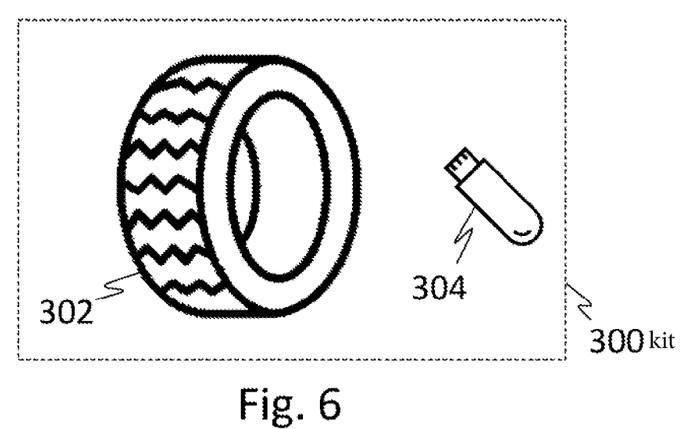
FIG. 6 schematically illustrates a kit according to an exemplary embodiment of the invention.

FIG. 6 schematically illustrates a kit 300 according to an exemplary embodiment of the invention. The kit 300 comprises a tyre 302 and a tyre model signal 304, the latter being illustrated by a flash drive (such as a USB flash drive). The tyre model signal 304 may, however, be stored on various conceivable media, and is not necessarily delivered physically together with the tyre 302, but may be accessible by downloading the tyre model signal 304 from a remote server, or the like. The tyre model signal 304 is adapted to generate a value of a longitudinal tyre force as a function of longitudinal wheel slip of the tyre when mounted on the vehicle. Thus, when ordering a tyre 302, e.g. to a factory, or as a spare part, it may be combined with an associated tyre model signal 304, and provided as a kit 300. The tyre 302 will be mounted to the vehicle 100 and the associated tyre model signal 304 may be downloaded to or be accessible by the VMM 110. Then, in later operation of the vehicle, the VMM 110 may update and correct the function generated by the tyre model signal 304, i.e. the VMM 100 may update a function of a tyre model 120, based on tyre input parameter(s) 124, and provide accurate torque control, analogously with the previous explanations.

Thus, from the above explanation it should be understood that the kit 300 may be used by a vehicle 100 and/or a control unit 110. In general terms, according to at least one exemplary embodiment of the inventive kit, the kit (in particular the tyre model signal) is configured to be used by a control unit according to the first aspect of the invention, including any embodiment thereof, wherein the tyre model signal of the kit provides said tyre model used by the control unit. Similarly, in general terms according to at least one exemplary embodiment of the inventive kit, the kit is configured to be used in a method according to the third aspect of the invention, including any embodiment thereof, wherein the tyre model signal of the kit provides said tyre model used in the method.

Figure 7:
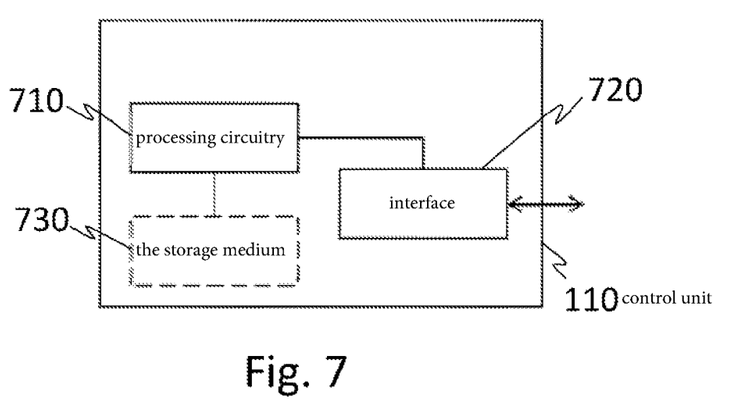
FIG. 7 schematically illustrates a control unit according to at least one exemplary embodiment of the invention.

FIG. 7 schematically illustrates a control unit 110 according to at least one exemplary embodiment of the invention. In particular, FIG. 7 illustrates, in terms of a number of functional units, the components of a control unit 110 according to exemplary embodiments of the discussions herein. The control unit 110 may be comprised in the vehicle 100, e.g. in the form of a VMM unit. Processing circuitry 710 may be provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 110 to perform a set of operations, or steps, such as the method discussed in connection to FIG. 5. For example, the storage medium 730 may store the set of operations, and the processing circuitry 710 may be configured to retrieve the set of operations from the storage medium 730 to cause the control unit 110 to perform the set of operations. The set of operations may be provided as a set of executable instructions. Thus, the processing circuitry 710 is thereby arranged to execute exemplary methods as herein disclosed.

The storage medium 730 may also comprise persistent storage, which, for example may be any single one or combination of magnetic memory, optical memory, solid state memory or even remotely mounted memory.

The control unit may 110 further comprise an interface 720 for communications with at least one external device such as sensors providing tyre parameter inputs. As such, the interface 720 may comprise one or more transmitters and receivers, comprising analogue and digital components and a suitable number of ports for wireline or wireless communication.

The processing circuitry 710 controls the general operation of the control unit 110, e.g. by sending data and control signals to the interface 720 and the storage medium 730, by receiving data and reports from the interface 720, and by retrieving data and instructions form the storage medium 730. Other components, as well as the related functionality, of the control unit 110 are omitted in order not to obscure the concepts presented herein.

Thus, with reference also to the previously discussed figures, FIG. 7 shows an exemplary control unit 110 configured to control torque applied to a vehicle wheel 102 provided with a tyre 302. The control unit 110 comprises or is operatively connected to a data storage 118, which data storage 118 has a stored tyre model 120 for the tyre 302, wherein, in the tyre model 120, longitudinal tyre force Fx is represented as at least a function of longitudinal wheel slip, longitudinal wheel slip being dependent on rotational speed of the wheel 102 and velocity of the vehicle 100. The control unit 110 is configured to:
  receive at least one tyre parameter input 124, which tyre parameter input 124 includes a measured value of at least one parameter which affects the longitudinal slip stiffness of the tyre,
  correct said function in the stored tyre model 120 based on the received tyre parameter input 124,
  obtain a wheel torque request,
  convert the obtained wheel torque request to a wheel rotational speed request based on the corrected function, and
  send the wheel rotational speed request to an actuator 114, 116 for providing a rotational speed of the wheel 102 corresponding to said wheel rotational speed request.

Figure 8:
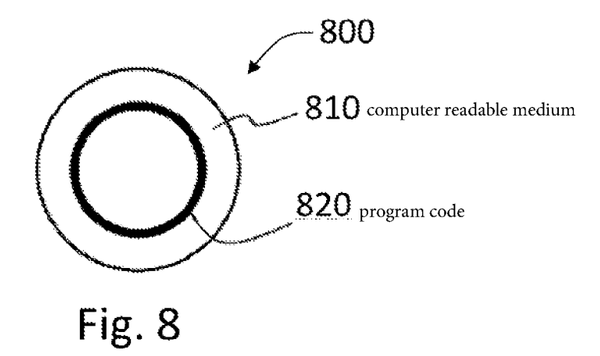
FIG. 8 schematically illustrates a computer program product according to at least one exemplary embodiment of the invention.

FIG. 8 schematically illustrates a computer program product 800 according to at least one exemplary embodiment of the invention. More specifically, FIG. 8 illustrates a computer readable medium 810 carrying a computer program comprising program code means 820 for performing the methods exemplified in FIG. 5, when said program product is run on a computer. The computer readable medium 810 and the program code means 820 may together form the computer program product 800.

The invention claimed is:

1. A control unit for controlling a vehicle wheel provided with a tire, wherein the control unit comprises or is operatively connected to a data storage, which data storage has a stored tire model for the tire,
  wherein the control unit is configured to:
    representing a longitudinal tire force, in the tire model, as at least a function of a longitudinal wheel slip, wherein the longitudinal wheel slip is dependent on a rotational speed of the wheel and a velocity of a vehicle, receiving at least one tire parameter input, which tire parameter input includes a measured value of at least one parameter which affects a longitudinal slip stiffness of the tire, correct said function in the stored tire model by applying a slip stiffness correction factor on said function based on the received tire parameter input, wherein the correction occurs at the same or at different intervals dependent on the received tire parameter input;

establishing a relation between the slip stiffness correction factor and the received tire parameter input is established by identifying properties of the tire at different conditions, obtaining or generating a wheel torque request, converting the obtained or generated wheel torque request to a wheel rotational speed request based on the corrected function, and sending the wheel rotational speed request to an actuator for providing the rotational speed of the wheel corresponding to said wheel rotational speed request.

2. The control unit according to claim 1, wherein said at least one parameter is selected from the group consisting of:
age of the tire,
ambient temperature,
inflation pressure of the tire,
normal load on the tire, and
wear of the tire.

3. The control unit according to claim 1, wherein the slip stiffness correction factor has a variation with respect to the parameter.

4. The control unit according to claim 1, wherein the control unit is configured to receive a plurality of different tire parameter inputs, each tire parameter input including a measured value of a respective one of a plurality of parameters which affect the longitudinal slip stiffness of the tire, wherein the control unit is configured to correct said function in the stored tire model by applying a combined correction factor on said function, the combined correction factor being a function of a plurality of slip stiffness correction factors, wherein each slip stiffness correction factor has a variation relative to a respective one of said plurality of parameters.

5. The control unit according to claim 1, wherein said at least one tire parameter input is a primary tire parameter input and said at least one parameter is a primary parameter, wherein the control unit is further configured to correct said function in the stored tire model based on at least one secondary tire parameter input which secondary tire parameter input includes a measured value of at least one secondary parameter, the at least one secondary parameter being selected from the group consisting of:
rolling radius,
nominal peak friction, and
rolling resistance coefficient.

6. The control unit according to claim 1, wherein in its conversion of the wheel torque request to the wheel rotational speed request, the control unit is configured to calculate a slip request based on the corrected function and to transform the slip request to the wheel rotational speed request using the slip formula:

$$\lambda = \frac{R\omega - v_x}{\max(|R\omega|, |v_x|)}$$

where $\lambda$ is the longitudinal wheel slip, where $R\omega$ is the rotational speed of the wheel, of which R is the wheel radius in meters and $\omega$ is the angular velocity of the wheel, and where $v_x$, is the longitudinal speed of the wheel.

7. A vehicle comprising, a control unit including or operatively connected to a data storage, which data storage has a stored tire model for the tire, wherein the control unit is configured to:

representing a longitudinal tire force, in the tire model, as at least a function of a longitudinal wheel slip, wherein the longitudinal wheel slip is dependent on a rotational speed of the wheel and a velocity of a vehicle, receiving at least one tire parameter input, which tire parameter input includes a measured value of at least one parameter which affects a longitudinal slip stiffness of the tire, correct said function in the stored tire model by applying a slip stiffness correction factor on said function based on the received tire parameter input, wherein the correction occurs at the same or at different intervals dependent on the received tire parameter input;

establishing a relation between the slip stiffness correction factor and the received tire parameter input is established by identifying properties of the tire at different conditions, obtaining or generating a wheel torque request, converting the obtained or generated wheel torque request to a wheel rotational speed request based on the corrected function, and sending the wheel rotational speed request to an actuator for providing the rotational speed of the wheel corresponding to said wheel rotational speed request.

8. A method for controlling torque applied to a vehicle wheel provided with a tire, comprising:

representing a longitudinal tire force, in a tire model, as at least a function of a longitudinal wheel slip, wherein the longitudinal wheel slip is dependent on a rotational speed of the wheel and a velocity of a vehicle, receiving at least one tire parameter input, which tire parameter input includes a measured value of at least one parameter which affects a longitudinal slip stiffness of the tire, correcting said function in the tire model for the tire at the same or at different intervals by applying a slip stiffness correction factor on said function based on the received tire parameter input;

establishing a relation between the slip stiffness correction factor and the received tire parameter input by identifying properties of the tire at different conditions, obtaining or generating a wheel torque request, converting the obtained or generated wheel torque request to a wheel rotational speed request based on the corrected function, and sending the wheel rotational speed request to an actuator for providing the rotational speed of the wheel corresponding to said wheel rotational speed request.

9. The method according to claim 8, wherein said at least one parameter is selected from the group consisting of:
age of the tire,
ambient temperature,
inflation pressure of the tire,
normal load on the tire, and
wear of the tire.

10. The method according to claim 8, wherein the slip stiffness correction factor has a variation with respect to the parameter.

11. The method according to claim 8, comprising:
receiving a plurality of different tire parameter inputs, each tire parameter input including a measured value of a respective one of a plurality of parameters which affect the longitudinal slip stiffness of the tire, wherein said step of correcting comprises applying a combined correction factor on said function, the combined correction factor being a function of a plurality of slip stiffness correction factors, wherein each slip stiffness correction factor has a variation relative to a respective one of said plurality of parameters.

12. The method according to claim 8, wherein said at least one tire parameter input is a primary tire parameter input and said at least one parameter is a primary parameter, wherein the act of correcting comprises correcting said function in the stored tire model based on at least one secondary tire parameter input which secondary tire parameter input includes a measured value of at least one secondary parameter, the at least one secondary parameter being selected from the group consisting of:
rolling radius,
nominal peak friction, and
rolling resistance coefficient.

13. The method according to claim 8, wherein the act of converting comprises calculating a slip request based on the corrected function and to transform the slip request to the wheel rotational speed request using the slip formula:

$$\lambda = \frac{R\omega - v_x}{\max(|R\omega|, |v_x|)}$$

where $\lambda$ is the longitudinal wheel slip, where $R\omega$ is the rotational speed of the wheel, of which R is the wheel radius in meters and $\omega$ is the angular velocity of the wheel, and where $v_x$, is the longitudinal speed of the wheel.

14. A non-transitory computer readable medium carrying a computer program comprising program code for performing the steps of claim 8 when said program code is run on a computer.

15. A kit, comprising: a tire and a tire model signal, the tire model signal being adapted to generate a value of a longitudinal tire force as a function of longitudinal wheel slip of the tire, wherein said function is corrected by applying a slip stiffness correction factor based on a received tire parameter input and wherein a relation between the slip stiffness correction factor and the received tire parameter input is established by identifying properties of the tire at different conditions, wherein the value of longitudinal force is generated at a predetermined interval, when mounted on a vehicle.

* * * * *